United States Patent
Branda et al.

(10) Patent No.: US 8,387,041 B2
(45) Date of Patent: *Feb. 26, 2013

(54) LOCALIZED MULTI-ELEMENT PROCESSOR RESOURCE SHARING AMONG LOGICAL PARTITIONS

(75) Inventors: Steven Joseph Branda, Rochester, MN (US); Christopher James Kundinger, Rochester, MN (US); Adam Thomas Stallman, Rochester, MN (US); Brett Michael Yokom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

This patent is subject to a terminal disclaimer.

(21) Appl. No.: 11/971,411

(22) Filed: Jan. 9, 2008

(65) Prior Publication Data

US 2009/0178049 A1 Jul. 9, 2009

(51) Int. Cl.
*G06F 9/455* (2006.01)
*G06F 9/46* (2006.01)

(52) U.S. Cl. ............................................. 718/1; 718/104
(58) Field of Classification Search .............. 718/1, 104
See application file for complete search history.

(56) References Cited

U.S. PATENT DOCUMENTS

| | | | |
|---|---|---|---|
| 6,625,638 B1* | 9/2003 | Kubala et al. ................. | 718/105 |
| 6,809,734 B2 | 10/2004 | Suzuoki et al. | |
| 6,957,435 B2 | 10/2005 | Armstrong et al. | |
| 7,945,908 B1* | 5/2011 | Waldspurger et al. ............ | 718/1 |
| 7,987,464 B2* | 7/2011 | Day et al. ....................... | 718/104 |
| 2006/0143617 A1* | 6/2006 | Knauerhase et al. ......... | 718/104 |
| 2007/0074207 A1 | 3/2007 | Bates et al. | |
| 2007/0130438 A1* | 6/2007 | Marr et al. .................... | 711/168 |
| 2008/0028408 A1* | 1/2008 | Day et al. ....................... | 718/104 |
| 2008/0244222 A1* | 10/2008 | Supalov et al. ................. | 712/13 |

OTHER PUBLICATIONS

Day et al. "Hardware and Software Architectures for the Cell Broadband Engine processor", IBM Systems and Technology Group, Codes+ISSS Conference, Sep. 2005.*

* cited by examiner

*Primary Examiner* — Jennifer To
*Assistant Examiner* — Brian Chew
(74) *Attorney, Agent, or Firm* — Wood, Herron & Evans LLP (57) ABSTRACT

A method, apparatus, and program product to allocate processor resources to a plurality of logical partitions in a computing device including a plurality of processors, each processor having at least one general purpose processing element and a plurality of synergistic processing elements. General purpose processing element resources and synergistic processing element resources are separately allocated to each logical partition. The synergistic processing element resources to each logical partition are allocated such that each synergistic processing element is assigned to a logical partition exclusively. At least one virtual processor is allocated for each logical partition. The at least one virtual processor may be allocated virtual general purpose processing element resources and virtual synergistic processing element resources that correspond to the general purpose processing element resources and synergistic processing element resources allocated to the logical partition.

21 Claims, 5 Drawing Sheets

LOCALIZED MULTI-ELEMENT PROCESSOR RESOURCE SHARING AMONG LOGICAL PARTITIONS

FIELD OF THE INVENTION

The present invention relates to computing systems, and more particularly to sharing the resources of multi-element processors between logical partitions.

BACKGROUND OF THE INVENTION

Modern requirements for a computer system may require that a computer be utilized to run several operating environments, or operating systems, at once, a technique often referred to as logical partitioning. In a typical embodiment, a single logically partitioned computer can run a plurality of operating systems in a corresponding plurality of logical partitions. Each operating system resides in its own logical partition, with each logical partition allocated a part of a processor, an entire processor, or multiple processors from the computer. Additionally, a portion of the computer's memory is allocated to each logical partition. All of the logical partitions are under the control of a partition manager. The partition manager is typically a part of the system firmware and manages the allocation of resources to the operating systems and logical partitions.

Recent advancements in processor technology have led to the development of a multi-element architecture (MEA) for processors. One multi-element processor architecture is the Cell Broadband Engine Architecture ("Cell") processor architecture, jointly developed by International Business Machines Corporation ("IBM"), Sony Computer Entertainment, and Toshiba. In a typical Cell processor, there is a general purpose Power Processing Element ("PPE") core with modest performance that controls a plurality of specialized Synergistic Processor Elements ("SPEs," collectively) with accelerated multimedia application capabilities, vector processing application capabilities, or other dedicated computation capabilities. The PPE and SPEs are typically connected by a specialized high bandwidth data bus, commonly referred to as an Element Interconnect Bus ("EIB"). Because of this architecture, a Cell processor typically runs with great efficiency when general tasks are handled by the GPPE and mathematically intense tasks are handled by SPEs. However, also because of the architecture, a Cell processor often presents a challenging architecture on which to develop and implement complex software applications.

In computers with at least one MEA processor, there may be a need to virtualize operations and run a plurality of operating systems in a corresponding plurality of logical partitions. Currently, logical partitioning technology does not account for processors like a MEA processor, which is a multi-core architecture having multiple logical units, including a general purpose processing element ("GPPE") and one or more synergistic processing elements ("SPEs"). In a typical logically partitioned computer, the logical partitions receive a percentage of physical processor, or CPU, resources. A virtualization layer time slices the CPU resources. Typically, time-slicing in a computer with a single CPU will cause the virtualization layer to alternate which logical partition's code runs on the single CPU. In conventional logically partitioned computers with more CPUs, time-slicing may alternate multiple logical partitions across multiple CPUs.

However, current logical partition technology typically does not work efficiently with MEA processors. A MEA processor often needs to take advantage of the particular strengths of its GPPE resources and specialized SPE resources to maximize performance. In a MEA processor, SPEs are typically designed to work on only one task at a time. As such, the SPEs are not typically configured with prediction units, caches, or out of order execution units. Additionally, SPEs typically have to be "configured" by an associated GPPE to perform a task. Unlike other processor architectures for which all of the allocatable resources in a processor can be allocated and time-sliced in essentially the same manner, significant architectural differences exist between GPPEs and SPEs, and due the heterogeneous nature of these different types of computing resources from the standpoint of allocating the resources to particular logical partitions and time-slicing, partitioning algorithms that might work well for GPPEs often would not work as well for SPEs.

Two operating system level programming models have been proposed to attempt to address logical partitioning issues of computers with MEA processors. Utilizing a MultiSPE programming model, all SPE resources are placed in a pool and assigned tasks from job queues in such a way as the SPEs can be said to be "shared" between logical partitions. However, use of a MultiSPE programming model does not guarantee a specific amount of SPE time that each logical partition receives because different jobs take varying amounts of time. In addition, an attempt to assign priority to tasks in a MultiSPE programming model may lead to starvation of SPE resources for a logical partition allocated less resources. Subsequently, the inability to control resources typically interferes with quality and efficiency of the use of a logical partition on a computer with at least one MEA processor.

Another operating system level programming model proposed to attempt to address logical partitioning issues of computers with MEA processors is Kernel Management of the GPPE resources and the SPE resources. Utilizing a Kernel Management programming model, both GPPEs and SPEs are collectively assigned slices of time according to logical partition requirements. In this model an entire Cell processor is time sliced in much the same way as a conventional processor. Although the GPPE resources may be easily time-sliced, the SPE resources often suffer great inefficiencies when an attempt is made to time slice such resources. In a Kernel Management model, the SPE resources are typically suspended and resumed in much the same way as is done for time slicing in computers with conventional processors in conventional virtualization implementations. This results in a high overhead and loss of efficiency. Each SPE must first have its data cleared, then reloaded by their associated GPPE with the data it is to process. Additionally, when the computer is configured with more than one logical partition, there is contention for SPE resources for logical partitions allocated fewer resources. Subsequently, this method often interferes with quality and efficiency of the logical partition on a computer with at least one MEA processor.

Consequently, there remains a need for effective sharing between logical partitions of the resources on a computer that utilizes multi-element architecture processors.

SUMMARY OF THE INVENTION

Embodiments of the invention provide for allocating processor resources to a plurality of logical partitions in a computing device configured with a plurality of processors with multi-element architecture configurations by separately managing the allocation of both general and synergistic processing element resources in each processor to logical partitions.

In accordance with some embodiments of the invention, there is provided a method of allocating processor resources to a plurality of logical partitions in a computing device of the type including a plurality of processors, each processor having at least one general purpose processing element and a plurality of synergistic processing elements. General purpose processing element resources and synergistic processing element resources are allocated to each logical partition such that the general purpose processing element resources and synergistic processing element resources are separately allocated to each logical partition. The allocation of the synergistic processing element resources to each logical partition includes allocating synergistic processing elements such that each synergistic processing element that is assigned to a logical partition is allocated exclusively to that logical partition.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Features of the present invention include a method, apparatus, and program product to separately share general purpose processing elements and synergistic processing elements of a computer with at least one multi-element architecture (MEA) processor between logical partitions.

In one embodiment, there is provided a method of allocating processor resources to a plurality of logical partitions in a computing device of the type including a plurality of processors, each processor having at least one general purpose processing element and a plurality of synergistic processing elements. General purpose processing element resources and synergistic processing element resources are allocated to each logical partition such that the general purpose processing element resources and synergistic processing element resources are separately allocated to each logical partition. The allocation of the synergistic processing element resources to each logical partition includes allocating synergistic processing elements such that each synergistic processing element that is assigned to a logical partition is allocated exclusively to that logical partition.

In one embodiment, virtual processors are allocated to each logical partition such that each virtual processor appears to the logical partition to which it is allocated as a normal MEA processor. Each virtual processor accesses at least a portion of the resources allocated to its logical partition to complete a task. The virtual processors may be allocated virtual general purpose processing element resources and virtual synergistic processing element resources that access corresponding general purpose processing element resources and synergistic processing element resources. The virtual processors perform the tasks requested by the logical partition.

In one embodiment, there is an attempt to allocate general purpose processing element resources and synergistic processing element resources to each logical partition such that the resources allocated to each logical partition are selected from one processor in an effort to localize, or compartmentalize, the processing of each logical partition.

In one embodiment, the free resources of the computing device are determined and reallocated in response to detecting a change in the free resources. The reallocation localizes the processing of at least one logical partition during the reallocation. In another embodiment, the free resources of the computing device are determined and the free resources are shared among the plurality of logical partitions. Particular free resources may be shared exclusively with particular logical partitions.

In one embodiment, the allocated general purpose processing element resources for a logical partition have access to the allocated synergistic processing element resources for that partition such that the allocated general purpose processing element resources can control the allocated synergistic processing element resources for that logical partition.

Hardware and Software Environment

Figure 1:
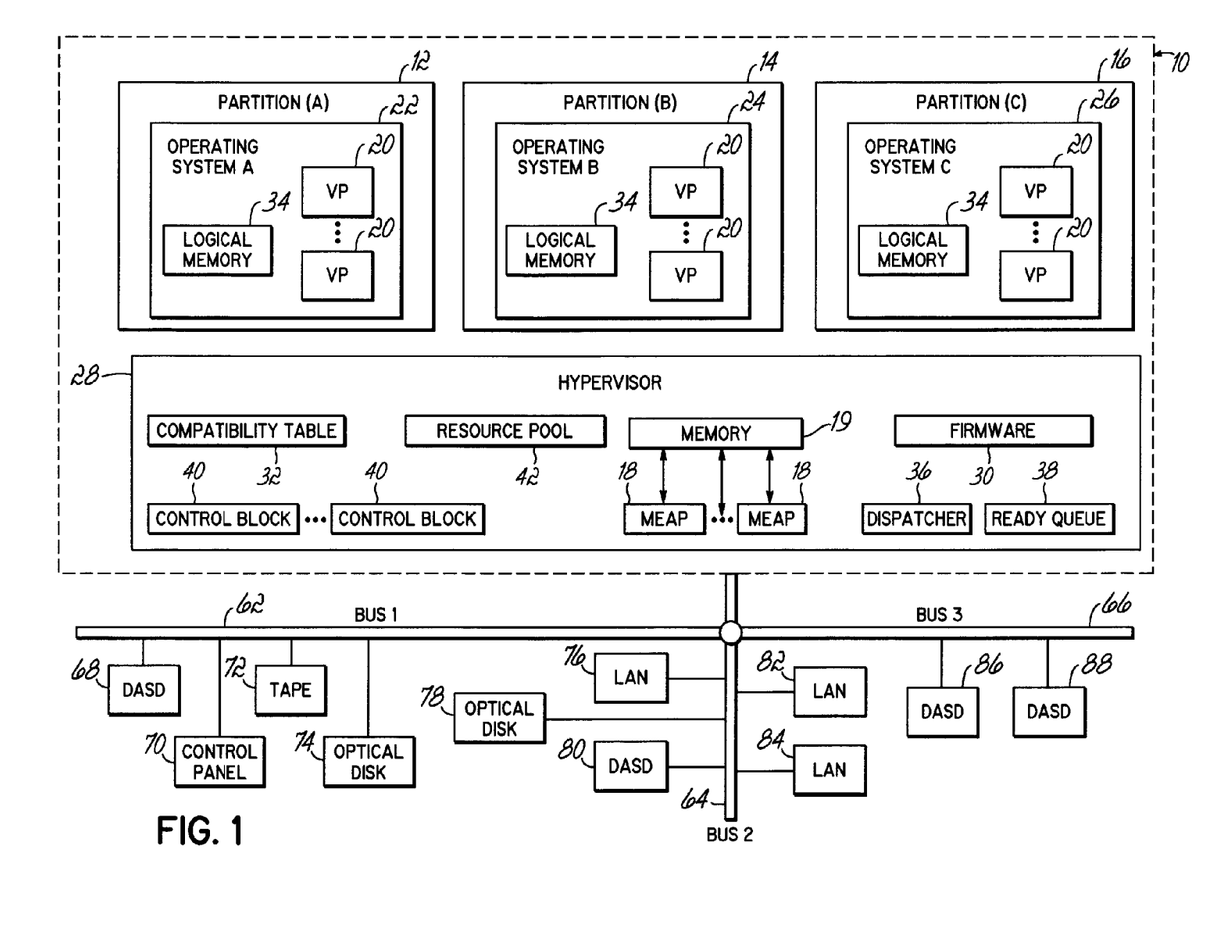
FIG. 1 is an exemplary hardware and software environment for a computing device configured with at least one multi-element architecture ("MEA") processor suitable for implementing effective sharing of resources between logical partitions consistent with the invention.

Turning to the drawings, wherein like numbers denote like parts throughout the several views, FIG. 1 illustrates an exemplary hardware and software environment for a computing device 10 configured with at least one multi-element architecture ("MEA") processor suitable for implementing effective sharing of resources between logical partitions consistent with embodiments of the invention. Computing device 10 more particularly represents the primary software components and resources used to implement a logically partitioned environment consistent with embodiments of the invention. As such, FIG. 1 may include a computing architecture characterized as a virtual machine design, as developed by International Business Machines Corporation.

The computing device 10 includes a plurality of logical partitions 12, 14, 16 that may share common processing resources among multiple processes. The computing device 10 may rely upon at least one MEA processor 18 (shown in FIG. 1 with the reference "MEAP") connected to a system memory 19. The at least one MEA processor 12 may execute software configured to simulate one or more virtual processors 20 in each partition 12, 14, 16. Computing device 10, in specific embodiments, may be a computer, computer system, server, disk array, or programmable device such as a multi-user computer, a single-user computer, a handheld device, a networked device (including a computer in a cluster configuration), a mobile phone, a video game console (or other gaming system), etc. Computing device 10 will be referred to as "computer" for the sake of brevity.

The partitions 12, 14, 16 may logically comprise a portion of a system's at least one MEA processor 18, memory, and other resources as assigned by a user or administrator. Each partition 12, 14, 16 may host an operating system 22, 24, 26 (respectively), each operating system having multiple virtual processors 20. In this manner, each partition 12, 14, 16 may operate substantially as if it is a separate computer.

An underlying program, called a hypervisor 28, or partition manager, may assign physical resources to each partition 12, 14, 16. For instance, the hypervisor 28 may intercept requests for resources from operating systems 22, 24, 26 to globally share and allocate resources. If the partitions 12, 14, 16 within computer 10 are respectively sharing the at least one MEA processor 18, the hypervisor 28 allocates General Purpose Processing Element (GPPE) cycles and one or more Synergistic Processing Elements (SPEs) between the virtual processors 20 of the partitions 12, 14, 16 sharing the at least one MEA processor 18. As such, the hypervisor 28 configures each virtual processor 20 with virtual GPPE resources and virtual SPE resources. The hypervisor 28 may include its own firmware 30 and compatibility table 32. Moreover, for purposes of this specification, the partitions may use either or both the firmware of the partition and hypervisor.

Whenever the hypervisor 28 creates, adds, or rebalances any GPPE and/or SPE resources utilized by the logical partitions 12, 14, 16, it does so by adding or removing virtual GPPE resources and/or virtual SPE resources from the one or more virtual processors 20 of the partitions 12, 14, 16. The virtual GPPE resources and virtual SPE resources control the visibility of the physical GPPE resources and physical SPE resources to the partition 12, 14, or 16, aligning the visibility of the one or more virtual processors 20 to act as customized MEA processor (i.e., the one or more virtual processors 20 may be configured with a different amount of GPPE resources and SPE resources than the physical at least one MEA processor 18).

After creating the virtual resources, the hypervisor 28 further coordinates the virtual GPPE resources and virtual SPE resources to access specific physical GPPE resources and physical SPE resources. For example, if the user allocates partition 12 50% of GPPE resources and two SPEs, when there is only one MEA processor 18 on computer 10, a virtual processor 20 may appear to partition 12 as a MEA processor configured with a GPPE and two SPEs. Also for example, if the user allocates partition 12 50% of the GPPE resources and two SPEs, and there is only one MEA processor 18 on computer 10, two virtual processors 20 may appear to logical partition as two MEA processors 18, each configured with GPPE resources and one SPE.

Each operating system 22, 24, 26 controls the primary operations of its respective logical partition 12, 14, 16 in a manner similar to the operating system of a non-partitioned computer. Each logical partition 12, 14, 16 may execute in a separate memory space, represented by logical memory 34. Moreover, each logical partition 12, 14, 16 may be statically and/or dynamically allocated a portion of the available resources in the computer 10. For example and as discussed herein, each logical partition 12, 14, 16 may share the at least one MEA processor 18 by sharing a percentage of GPPE resources as well as a portion of the available memory space for use in logical memory 34. Each logical partition 12, 14, 16 may be further assigned SPE resources. In this manner, the GPPE resources and SPE resources of a given MEA processor 18 may be utilized by more than one logical partition.

The hypervisor 28 may include a dispatcher 36 that manages the dispatching of virtual resources to physical resources on a dispatch list, or ready queue 38. The ready queue 38 comprises memory that includes a list of virtual processors having work that is waiting to be dispatched on the at least one MEA processor 18. The hypervisor 28 shown in FIG. 1 also includes MEA processors 18 and processor control blocks 40. The processor control blocks 40 comprise memory that includes a list of virtual processors waiting for access on a respective MEA processor 18.

When resources of the at least one MEA processor 18 are not being utilized, the hypervisor 28 may track the free resources in at least one resource pool 42. The at least one pool 42 may include resources of the computer 10 (GPPE resources and SPE resources) that are available for performing a task, or otherwise available for processing data. In some embodiments consistent with the invention, the hypervisor 28 may be configured to allocate free resources to the partitions 12, 14, 16 from the at least one pool 42. In alternate embodiments, the partitions 12, 14, 16 may be configured with their own resource pools maintained by the hypervisor 28.

Additional resources, e.g., mass storage, backup storage, user input, network connections, and the like, are typically allocated to the partitions 12, 14, 16 in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 1 illustrates, for example, three logical buses 62, 64 and 66, with a plurality of resources on bus 62, including a direct access storage device (DASD) 68, a control panel 70, a tape drive 72 and an optical disk drive 74, allocated to a partition. Bus 64, on the other hand, may have resources allocated on a resource-by-resource basis, e.g., with local area network (LAN) adaptor 76, optical disk drive 78 and DASD 80 allocated to logical partition 12, and LAN adaptors 82 and 84 allocated to logical partition 14. Bus 66 may represent, for example, a bus allocated specifically to logical partition 14, such that all resources on the bus, e.g., DASD's 86 and 88, are allocated to the same logical partition. In an alternate embodiment, the present invention may utilize one shared resource pool maintained in the hypervisor 28. In that embodiment, the hypervisor 28 may be configured to dynamically allocate shared resources to logical partitions 12, 14, 16 directly from the resource pool.

It will be appreciated that the illustration of specific resources in FIG. 1 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors used to interface the computer with the specific hardware devices.

The various software components and resources illustrated in FIG. 1 may be implemented in a number of manners, including using various computer software applications, routines, components, programs, objects, modules, data structures, etc., referred to hereinafter as "computer programs", "tools", "programs" or "program code", Program code typically comprises one or more instructions that are resident at various times in various memory and storage devices in the computer, and that, when read and executed by at least one MEA processor in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, electronic memory (including USB memory drives), magnetic tape, optical disks (e.g., CD-ROM's, DVD's, HD-DVD's, Blu-Ray Discs, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Though not shown in FIG. 1, for instance, one skilled in the art will appreciate that other partitions may be included within other embodiments, including a partition that comprises part of the hypervisor 28. This hypervisor partition may function in many ways like the conventional partitions 12, 14, 16 (and associated operating systems), but has no user interface for the customer to protect it from failures that might otherwise come about through user interaction. Furthermore, while multiple MEA processors 18 are shown in FIG. 1, one skilled in the art will appreciate that more or fewer MEA processors 18 may be implemented. Furthermore, while three partitions 12, 14, 16 are shown in FIG. 1, one skilled in the art will appreciate that more or fewer partitions may be implemented. Furthermore, while two embodiments of the one or more virtual processors were described, one skilled in the art will appreciate that more or fewer virtual processors with more or fewer GPPE resources and SPE resources may be implemented in each logical partition 12, 14, or 16. Other alternative hardware and/or software environments may thus be used without departing from the scope of the invention.

Multi-Element Architecture Processor Configuration

Figure 2:
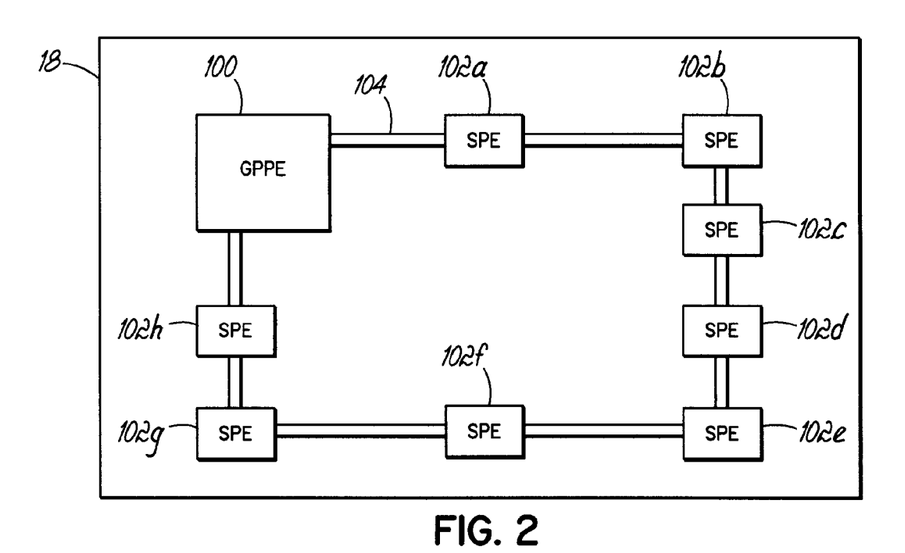
FIG. 2 illustrates the processor level configuration of the at least one MEA processors utilized by the computing device of FIG. 1 to implement the functionality of the present invention.

FIG. 2 illustrates the processor level configuration of a MEA processor 18 utilized to implement the functionality of the present invention. In one embodiment of the invention, each MEA processor 18 includes a General Purpose Processing Element ("GPPE") 100 and a plurality of Synergistic Processing Elements ("SPEs") 102*a-h*. In the illustrated embodiment of FIG. 2, a MEA processor implemented as a Cell processor with a single GPPE 100 and eight SPEs 102*a-h* are shown for the sake of example. A MEA processor 18 having two or more GPPEs and a greater or lesser number of SPEs may be used in conjunction with embodiments of the invention.

Generally speaking, a GPPE 100 acts as a controller for each SPE 102a-h. The GPPE 100 generally maintains a job queue, schedules jobs in the SPEs 102*a-h*, does general processing, and monitors the progress of operations on the SPEs 102*a-h*. In order for a partition to access any SPE 102*a-h* on a specific MEA processor, the partition is assigned a percentage of GPPE 100 on that specific MEA processor. For the sake of brevity, unless specifically discussing specific GPPEs or SPEs, the resources of a MEA processor 18 will be referred to as "GPPE resources" or "SPE resources."

The GPPE resources may be single or multi-threaded general operation processors and may be configured to run conventional operating systems similar to other processors. One or more SPEs may be designed to function as a graphics engine, an encryption/decryption engine, or a co-processor. One or more SPEs may also be designed for accelerated multimedia processing, or be dedicated to vector, scalar, fixed point, or floating point mathematical calculations. Each SPE resource may fetch a job from the GPPE resource on the same MEA processor 18, execute it, and synchronize with the GPPE resource once execution is complete. SPE resources may also be configured to run distinct programs and engage in stream processing, allowing explicit scheduling for each SPE resource. Because they are processing elements, each GPPE resource and each SPE resource may be configured with one or more logical caches (not illustrated).

In a MEA processor 18, GPPE resources are connected to SPE resources through a specialized high-speed Element Interconnect Bus ("EIB") 104. As illustrated, the EIB 104 may be a circular bus having two channels in opposite directions and connected to memory, a system interface for external communication, test and debug logic, or a memory flow controller (connections to the EIB 104 other than GPPE resources and SPE resources not illustrated). Through the EIB 104, the GPPE resources may load or collect data and/or instructions for each of the SPE resources. The data and/or instructions may be loaded from the memory 19 into the GPPE resources if the data and/or instructions don't already reside in a cache. The GPPE resources may further communicate with the memory 19 to load data and/or instructions to the memory 19.

Those skilled in the art will recognize that the exemplary environment illustrated in FIG. 2 is not intended to limit the present invention. Though not shown in FIG. 2, for instance, one skilled in the art will appreciate that more than one GPPE, and more or fewer SPEs may be included within other embodiments of a MEA processor. As such, other alternative hardware environments may thus be used without departing from the scope of the invention.

Logical Partition Management With MEA Processors

Figure 3:
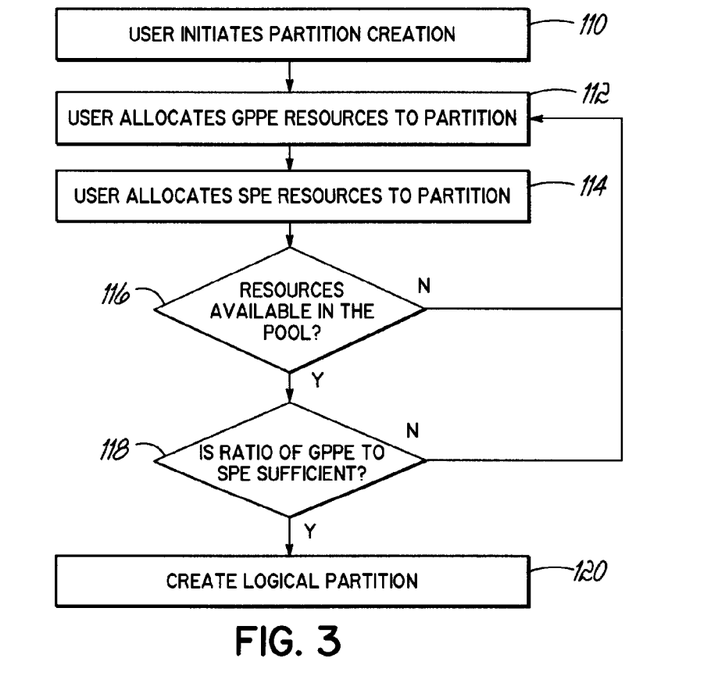
FIG. 3 is a flowchart having steps executable by the computing device of FIG. 1 for resource management during the creation of logical partitions.

FIG. 3 is a flowchart having steps executable by the computer 10 of FIG. 1 for resource management during the creation of the partitions 12, 14, 16 when utilizing the at least one MEA processor 18. Returning to FIG. 3, in block 110, a user initiates creation of a logical partition. The user may initiate the creation of logical partition 12, 14, or 16 through the control panel 70 connected to the computer 10. Alternately, the user may be connected to computer 10 through one of the network interfaces 76, 82, or 84 and initiate the creation of partition 12, 14, or 16 across a network.

In block 112, the user allocates the GPPE resources for partition 12, 14, or 16. The GPPE resources allocated by the user may be expressed as a percentage of the total GPPE resources of computer 10 (i.e., the user wants to use one-half, or 50%, of all GPPE resources on computer 10). These GPPE resources may be configured by the program code across the GPPE resources of all MEA processors 18. A user may wish to allocate a partition 12, 14, or 16 a large amount GPPE resources when there is only general processing being performed on the partition 12, 14, or 16. For example, the partition 12, 14, or 16 may be used to operate an application with only minimal vector or mathematical computations. In that situation, operation of the partition 12, 14, or 16 may be optimized with mainly GPPE resources, as there is little need for the specialized processing capabilities of the SPE resources.

Once the GPPE resources are allocated, in block 114 the user allocates the SPE resources for the partition 12, 14, or 16. The SPE resources allocated by the user may be expressed as a percentage or subset of the SPE resources of computer 10. Each SPE resource is desirably allocated in whole only (i.e., it is not desirable to allocate 50% of SPE 102a to logical partition 14, and 50% to logical partition 16) to prevent inefficiency from constantly loading and unloading data and/or instructions to or from each SPE resource. As such, the program code configures the logical partition 12, 14, or 16 with a subset of the SPE resource (i.e., SPEs are configured in whole and not shared across logical partitions 12, 14, or 16 in the initial setup). The user may wish to allocate the partition 12, 14, or 16 a large amount of SPE resources when there is only specialized processing being performed on the partition 12, 14, or 16. For example, the partition 12 may be used to encode digital video or music. In that situation, operation of the partition 12 may be optimized utilizing mainly SPE resources, as there is a lesser need for the generalized processing capabilities of the GPPE resources.

As shown in blocks 112 and 114, the user may separately allocate the GPPE resources and the SPE resources. In block 116, the program code determines whether the resources specified by the user in blocks 112 and 114 are available. The program code may determine from the at least one pool 42 whether there are GPPE resources and/or SPE resources that can be configured for the partition 12, 14, or 16. In block 116, the program code may determine whether the GPPE resources that can be configured for the partition can access SPE resources that can be configured for the partition. In the illustrated embodiment, when the resources requested by the user are not available in the pool 42, the program code will notify the user and return to block 112, allowing the user the opportunity to attempt a new configuration of GPPE and/or SPE resources. In the illustrated embodiment, when the GPPE resources that can be configured for the partition 12, 14, or 16 cannot access SPE resources that can be configured for the partition 12, 14, or 16, the program code will notify the user and return to block 112, allowing the user the opportunity to attempt a new configuration of GPPE and/or SPE resources. In an alternate embodiment, after the determination in block 116, the program code may give the user a recommendation to that indicates alternate configurations of GPPE and/or SPE resources for computer 10. The user may be given an option to accept the recommendation and proceed back to block 112 or proceed. In another alternate embodiment, the user may be given an option to automatically accept the recommendation and proceed.

Since SPE resources and GPPE resources are linked (i.e., GPPE resources on a particular MEA processor are be allocated to schedule jobs on the SPE resources on that particular MEA processor) the program codes determines whether the GPPE resources in block 118 are appropriate for the SPE resources. In block 118, when the ratio of GPPE resources to SPE resources is not high enough (i.e., user assigns GPPE resources as 0% and SPE resources as 10%, or computer 10 requires a percentage of GPPE resources for each SPE, such as each partition utilizing SPE resources must be assigned at least 5% of the associated GPPE resources for each SPE), the program code will prompt the user to re-allocate GPPE resources to the partition 12, 14, or 16 and return to block 112. In an alternate embodiment, after the determination in block 118, the program code may give the user a recommendation that indicates possible impacts to computer 10 performance with the configuration entered. The user may be given a chance to accept the recommendation and proceed back to block 112 or proceed. In another alternate embodiment, the user may be given a chance to automatically accept the recommendation and proceed.

In block 120, the program code creates the partition 12, 14, or 16. In block 120, the hypervisor 28 allocates the partition 12, 14, or 16 one or more virtual processors 20, each virtual processor 20 having virtual GPPE resources and virtual SPE resources, and logical memory 34. The virtual GPPE resources and virtual SPE resources control the visibility of the physical GPPE resources and physical SPE resources allocated to the partition 12, 14, or 16, aligning the visibility of the one or more virtual processors 20 with the allocation of the resources of the at least one MEA processor 18. By presenting the one or more virtual processors 20 as at least one MEA processor 18 to the partition 12, 14, or 16, the operating system 22, 24, or 26 running in that respective partition 12, 14, or 16 is capable of treating the virtual MEA processors in the same manner as the operating system would treat physical MEA processors if the operating system 22, 24, or 26 were running in a non-logically partitioned computer. After allocating the resources, the program code will remove the resources from the at least one pool 42 in block 120.

During the allocation of resources to the partition 12, 14, 16, the program code attempts to configure all GPPE resources and SPE resources allocated to the partitions 12, 14, 16 onto as few MEA processors 18 as possible in block 120. In one embodiment, the program code analyzes the allocation of SPEs to corresponding GPPEs on the partitions 12, 14, 16 using a Specialized to Generalized Affinity Ratio ("SGAR"). The SGAR is a ratio of the SPEs to the number of MEA processors 18 that the SPEs are spread across for each partition. In particular, when the SGAR is equal to the number of SPEs utilized for the partition 12, 14, 16, the resulting configuration may be considered optimum.

Allocating Free Resources With a Pool of MEA Resources

After the partitions 12, 14, 16 have been created, there may be unallocated resources. Unassigned GPPE and/or SPE resources are tracked by the program code in the at least one pool 42. The program code may allocate free resources from the at least one pool 42 to one or all of the partitions 12, 14, 16. The option to allow the allocation of free resources may be set by the user or administrator of the computer 10.

Figure 4:
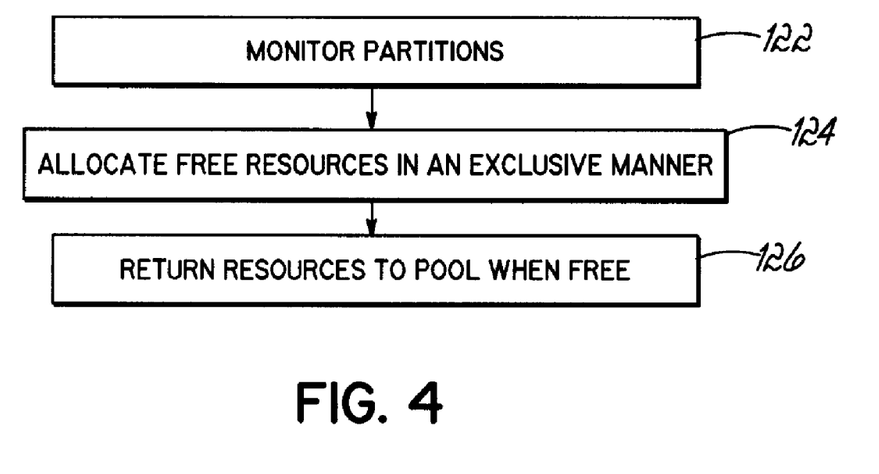
FIG. 4 is a flowchart having steps executable by the computing device of FIG. 1 for exclusively allocating free resources to one or more logical partitions.

In one embodiment consistent with the invention, free resources in the at least one pool 42 may be allocated to the partitions 12, 14, 16 exclusively. In this way, free resources may be allocated to the partitions 12, 14, 16 based on current load situations. The free resources in the at least one pool 42 may be allocated to the partitions 12, 14, 16 for a specific task or a period of time. FIG. 4 is a flowchart having steps executable by the computer 10 of FIG. 1 for exclusively allocating free resources to one or more partitions 12, 14, 16 utilizing at least one MEA processor 18. Returning to FIG. 4, after configuration of the partitions 12, 14, 16, the program code monitors the partitions 12, 14, 16 and detects the processing requests (or load) of each partition 12, 14, 16 in block 122. The program code may determine the load of the partitions 12, 14, 16 by referencing the ready queue 38 of each partition 12, 14, 16. In block 124, the program code may exclusively allocate free GPPE and/or SPE resources in the at least one pool 42 to a partition 12, 14, or 16. The program code allocates free resources to the partitions 12, 14, 16 in such a way that the more processing requests by the partition 12, 14, 16, the larger the proportion of free resources the partition 12, 14, 16 is allocated. For example, if partition 12 is requesting a significant amount GPPE resources, and partition 14 is requesting a significant amount of SPE resources, when there are free GPPE and SPE resources in the at least one pool 42, the program code allocates more GPPE resources to partition 12 and more SPE resources to partition 14 in an exclusive manner.

Additionally in block 124, the program code attempts to maximize the SGAR and localize each partition 12, 14, 16 to one MEA processor 18. The program code may allocate the free resources to the partition 12, 14, 16 for a period of time or for a specific task. In block 126, the program code returns the free resources to the pool 42 when the task has been performed or time for the partition 12, 14, 16 to utilize the free resource has expired.

Figure 5:
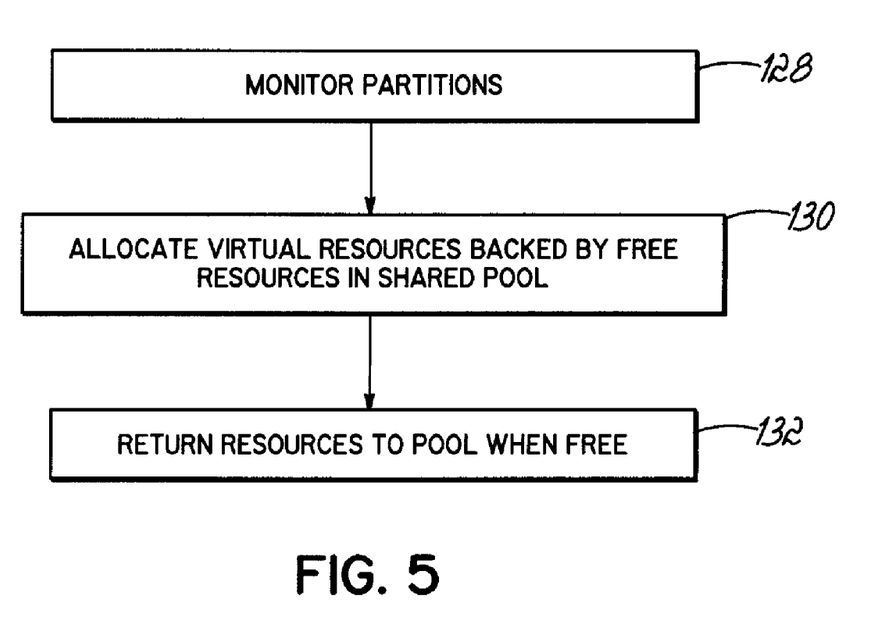
FIG. 5 is a flowchart having steps executable by the computing device of FIG. 1 for sharing resources amongst one or more logical partitions.

In an alternate embodiment consistent with the invention, free resources in the at least one pool 42 may be allocated to the partitions 12, 14, 16 in a shared manner. In this way, the "shared" resources may be allocated to all the partitions 12, 14, 16. User allocated resources remain available to each partition 12, 14, 16 in an exclusive manner. FIG. 5 is a flowchart having steps executable by the computer 10 of FIG. 1 for sharing resources amongst one or more partitions 12, 14, 16 utilizing at least one MEA processor 18. Returning to FIG. 5, after configuration of the partitions 12, 14, 16, the program code monitors the partitions 12, 14, 16 and detects the processing requests (or load) of each partition 12, 14, 16 in block 128. The program code determines the load of the partitions 12, 14, 16 by referencing the ready queue 38. In block 130, the program code allocates shared resources in the pool 42 across one or more partitions 12, 14, 16. In block 130, the program code may allocate the shared resources by configuring additional virtual resources in the virtual processors 20 of the partitions 12, 14, 16. The additional virtual resources may be virtual GPPE resources or virtual SPE resources. The additional virtual resources may be allocated to the partitions 12, 14, 16 based on their load. In block 130, the program code may configure more virtual resources than there are actual resources on the at least one MEA processor 18. In this way, when the partitions 12, 14, 16 schedule a job or task on the virtual SPE and/or virtual GPPE, and all user allocated SPE resources and/or GPPE resources are busy, the partitions 12, 14, 16 contend for the shared SPE resources and/or shared GPPE resources. When the partitions 12, 14, 16 attempt to access the same shared resource, the program code will allocate the shared resource in a round-robin manner (i.e., equal sharing amongst all partitions), a first-come-first-served manner (i.e., partitions 12, 14, 16 that access the shared resources first receive the resource exclusively for a time), or a time-sliced manner. In block 132, the program code returns the shared resources to the pool 42 when it determines that the load has sufficiently decreased.

Rebalancing Resources With a Pool of MEA Resources

Figure 6:
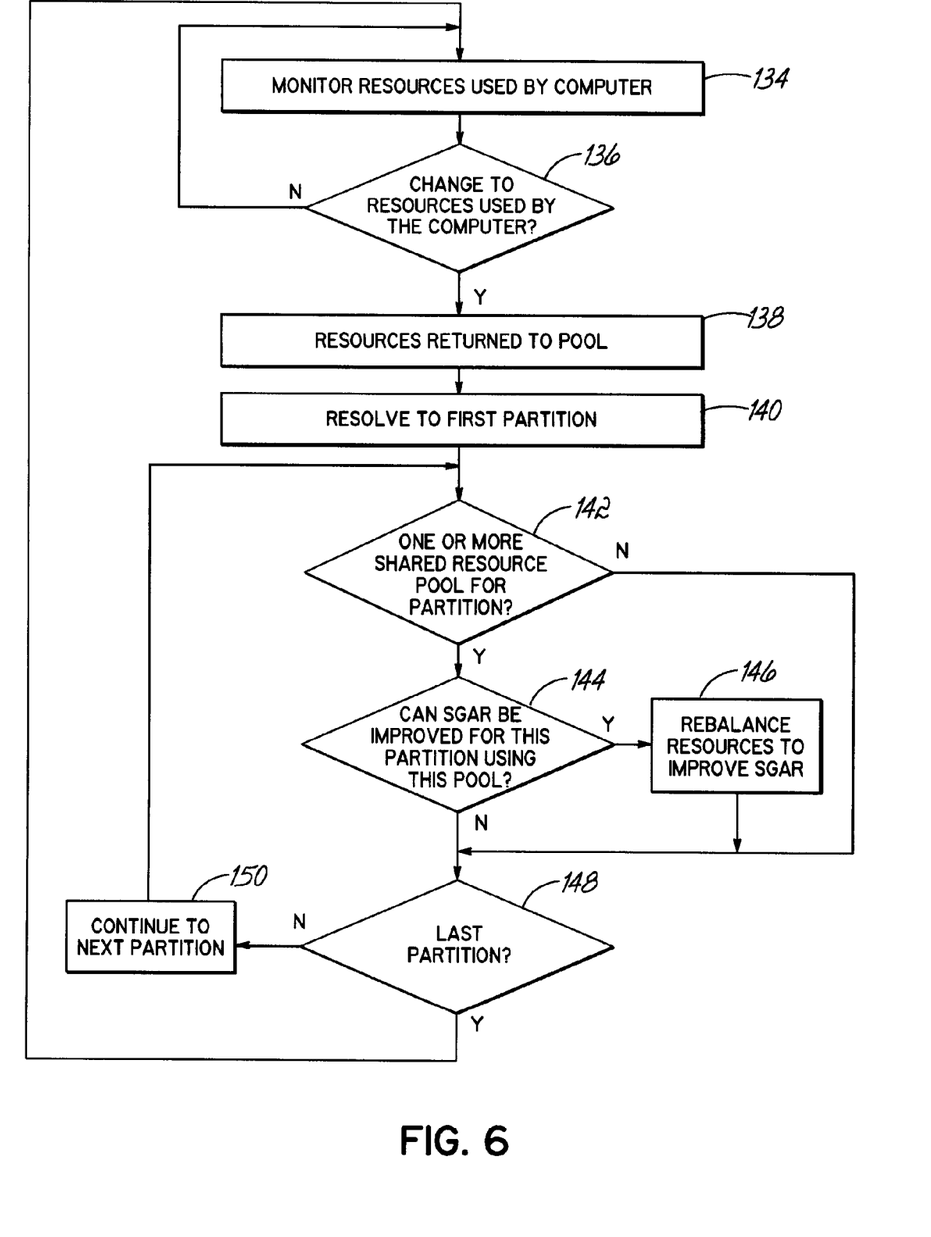
FIG. 6 is a flowchart having steps executable by the computing device of FIG. 1 for resource management during the rebalancing of resources of one or more logical partitions.

In one embodiment of the invention, the program code rebalances the resources of the computer 10 in response to an event that changes the free resources in the at least one pool 42. FIG. 6 is a flowchart having steps executable by the computer 10 of FIG. 1 for resource management during the rebalancing of resources of one or more logical partitions 12, 14, 16 utilizing at least one MEA processor 18. Returning to FIG. 6, in block 134 the program code monitors the resources used by the computer 10. In block 136, the program code determines whether a change has occurred to the resources used by the computer 10. The change in resources may occur when the user substantially terminates an existing partition 12, 14, 16. The change in resources may also occur in response to operations of the hypervisor 28, newly configured resource usage of the existing partitions 12, 14, 16, when a new partition is configured, or when the computer 10 recovers from a power down event. In one embodiment, the change frees GPPE resources and/or SPE resources. When the program code determines that the change in resources has not occurred in block 136, the program code will continue to monitor the resources at block 134. When the program code determines that the change in resources has occurred in block 136, the program code will continue to block 138.

In block 138, newly freed resources are returned to the at least one pool 42. After resources are returned to the at least one pool 42, or when there are no newly freed resources, the program code will continue to block 140. In block 140, the program code resolves to the first logical partition of the computer 10.

In block 142, the program code determines whether the at least one pool 42 can be accessed by the partition 12, 14, or 16. When the logical partition 12, 14, or 16 has access to the at least one pool 42, the program code determines in block 142 whether the SGAR can be improved for the partition 12, 14, or 16 by utilizing the free resources in the at least one pool 42. In block 144, the program code will determine the SGAR for the user allocated resources of partition 12, 14, or 16. The program code then analyzes the free resources and may compare the SGAR for the user allocated resources of partition 12, 14, or 16 to rebalanced resource configurations of partition 12, 14, or 16 that utilize one or more of the free resources. In block 142, the program code may analyze the user allocated resources currently used by the partition 12, 14, or 16 and the free resources in the at least one pool 42 to determine if the resources used by the partition 12, 14, or 16 can be localized to one MEA processor 18.

When the program code determines that the SGAR can be improved in block 144, the program code rebalances the resources to improve the SGAR in block 146. In block 146, the program code may localize resources used by the partition 12, 14, or 16 onto one MEA processor 18, if possible, without changing the overall allocation of resources for the partition 12, 14, or 16. In block 146, the program code may localize resources used by the partition 12, 14, or 16 by coordinating the virtual GPPE and/or virtual SPE resources to access different physical GPPE and/or physical SPE resources.

When there are no free resources in the at least one pool 42, the partition 12, 14, or 16 has been rebalanced, or the SGAR could not be improved using the free resources in the at least one pool 42, the program code determines whether it has reached the last partition in block 146. When the program code determines that the last partition has not been reached in block 148, the program code will resolve to the next partition in block 150 and proceed back to block 142. When the program code determines that the last partition has been reached in block 148, the program code will proceed back to monitoring the resources used by the computer 10 in block 134.

Further details and embodiments of the present invention will be described by way of the following examples.

EXAMPLE 1

Figure 7:
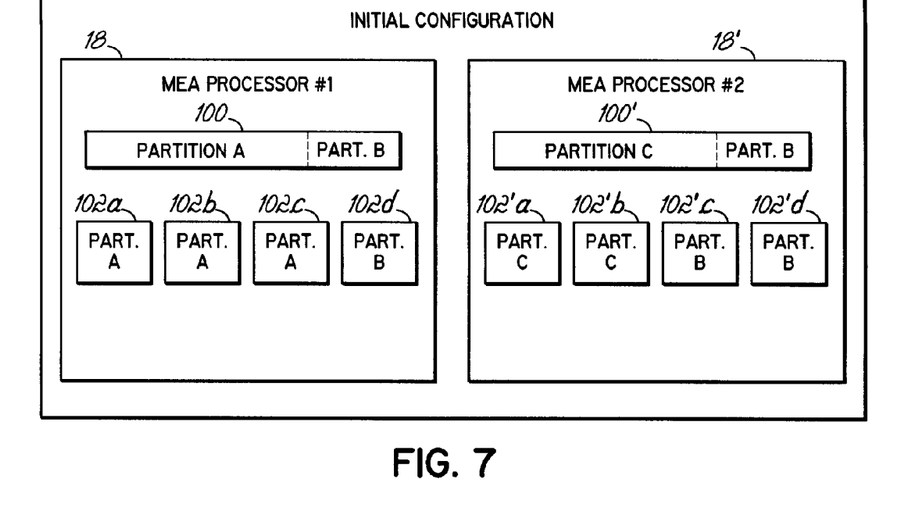
FIG. 7 is an illustration of an illustrative configuration of three partitions configured across two MEA processors in a computing device after resource allocation consistent with the invention.

By way of example, and as shown in FIG. 7, computer 10 may be configured with two MEA processors 18 and 18' and three partitions A, B, and C. Both MEA processor 18 and 18' (hereafter "MEA Processor 1" and "MEA Processor 2") may be configured with four SPEs 102a-d and 102'a-d. The user initially allocates 40% of the total GPPE resources to partition A, 25% of the total GPPE resources to partition B, and 35% of the total GPPE resources to partition C. Furthermore, the user initially allocates three SPEs to partition A, three SPEs to partition B, and two SPEs to partition C.

FIG. 7 is an illustration of the example configuration of the partitions A, B, and C across MEA Processor 1 and 2 in the computer 10 after resource allocation consistent with embodiments of the invention. In MEA Processor 1, the program code allocates partition A 80% of the GPPE 100 and three SPEs 102a-c. Also in MEA Processor 1, the program code allocates partition B 20% of the GPPE 100 and one SPE 102d. In MEA Processor 2, the program code allocates partition B 30% of the GPPE 100' and two SPEs 102'a-b. Also in MEA Processor 2, the program code allocates partition C 70% of the GPPE 100' and two SPEs 102'c-d. As such, the SGAR for partition A is 3, the SGAR for partition B is 1.5, and the SGAR for partition C is 2. Because of this configuration, partition A and partition C are localized on MEA Processor 1 and 2, respectively, and partition B is spread across both MEA Processor 1 and MEA Processor 2. Partitions A and C may be configured by the user in this way because of their greater general execution (GPPE) resource requirements.

Figure 8:
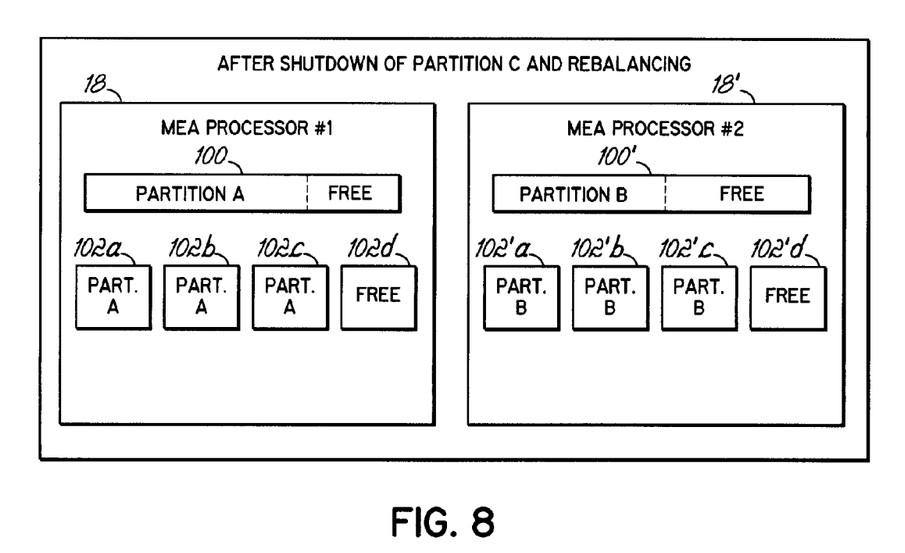
FIG. 8 is an illustration of the illustrative configuration of the three partitions configured across the two MEA processors in the computing device of FIG. 7 after the termination of one partition and rebalancing consistent with the invention.

The user may wish to terminate the operations of partition C. After the termination, the program code may rebalance the GPPE resources and/or SPE resources as illustrated and described in FIG. 6. FIG. 8 is an illustration of the example configuration of the partitions A and B across MEA Processor 1 and 2 in the computer 10 after the termination of partition C and rebalancing consistent with embodiments of the invention. In MEA Processor 1, the program code allocates partition A 80% of the GPPE 100 and three SPEs 102a-c. In MEA Processor 2, the program code allocates partition B 50% of the GPPE 100' and three SPEs 102'a-c. In this way, the program code has localized the partition A onto MEA Processor 1 and partition B onto MEA Processor 2 in a manner consistent with the invention. The SGAR of partition A has remained 3, while the SGAR of partition B has increased to 3.

After the rebalancing by the program code, there are free resources left in the computer. In particular, 20% of GPPE 100 and one SPE 102d in MEA Processor 1 is free, and 50% of GPPE 100' and one SPE 102'd in MEA Processor 2 is free. These free resources may be stored in the at least one pool 42 of the computer 10 and allocated to partition A and/or partition B in manners consistent with embodiments of the invention.

Example 2

By way of example, computer 10 may be configured with two partitions A and B, and one MEA processor 18 with a GPPE 100 and eight SPEs 102a-h. Partition A is expected to run mostly business applications that mostly require general performance, but will also process cryptographic protocols (i.e., SSL and TSL) that may benefit from SPE computations. Partition B is expected to run image analysis software, which is expected to utilize mostly SPEs and would only need GPPE resources to run the operating system and the user interface of the image analysis software.

To contrast the operation of embodiments consistent with the invention with conventional allocation techniques, consider conventional allocation schemes such as black box slicing, where processors are time-sliced as a whole, without any separate management of GPPE and SPE resources. If there was an emphasis on the business general processing requirements of partition A, it might be assigned 80% of all resources. In that configuration, partition A would get 80% of the GPPE resources and 80% of the SPE resources (which it doesn't need), leaving partition B starved for resources. If there was an emphasis on the image analysis software processing requirements of partition B, it might be assigned 80% of the GPPE resources (which it doesn't need) and 80% of the SPE resources, leaving partition A starved for resources. If the resources were split by giving partition A and B 50% of the GPPE resources and 50% of the SPE resources, partition A and B would both remain starved for resources.

Likewise, utilizing a conventional MultiSPE management technique, GPPE resources would be assigned to each partition A or B based on general processing load while the SPE resources would pull their work from job queues. In that configuration, partition A might be assigned 95% of the GPPE resources and partition B might be assigned 5% of the GPPE resources. As such, partition A would dominate GPPE resources with its mostly business applications. However, partition B would dominate all eight SPE 102a-h work queues with its many long-lived image analysis jobs. As such, partition A would not get the SPE resources it needed for the SSL computations to keep up with the business computations on the assigned GPPE and partition B would not get the GPPE resources it needed for the operating system and user interface of the image analysis software.

In addition, utilizing conventional Kernel management techniques, GPPE resources and SPE resources would each be time-sliced. As such, despite the resources configured to each partition, the heavy SPE resource demands from partition B would cause contention for the use of individual SPEs 102a-h, which would cause jobs on individual SPEs 102a-h to load data, start, stop, transmit data, and erase data for each time-slice. The overall processing power of MEA processor 18 would be greatly reduced and there would be no guarantee that partition A had the SPE resources it needed for the SSL computations to keep up with the business computations on the assigned GPPE.

In embodiments consistent with the invention, on the other hand, partition A might be configured by the user, and allocated, 90% of the GPPE resources and one dedicated SPE 102a to perform cryptographic computations. Partition B might be configured by the user, and allocated, 10% of the GPPE resources and the remaining SPEs 102b-h to do image analysis. As such, there would be no contention for SPE resources between partitions A and B, and each partition would be allocated an optimal amount of each type of resource to handle its particular workload, and without degrading the performance of SPE resources as might result were the SPE resources shared between partitions.

Example 3

By way of example, computer 10 may be configured with three or more MEA processors 18 and three partitions A, B, and C. Each MEA processor 18 (hereinafter MEA processor 1, 2, 3, etc.) is configured with eight SPEs 102a-h. Partition A is expected to need more then eight SPEs, while partition B and C are expected to use very few SPE resources.

Utilizing conventional black box slicing, MultiSPE management, or Kernel management techniques would result in an impossible configuration, as these methods are not designed to share SPE resources across processors. In addition, all resource allocation problems discussed in Example 2 would still apply. Most significantly, problems would occur when the algorithms attempted to chain the usage of SPE resources across more than one MEA processor 18.

In embodiments consistent with the invention, on the other hand, partition A may be assigned 80% of the GPPE and all eight SPEs 102*a-h* from MEA processor 1. Partition A may also be assigned 10% of the GPPE and six of the SPEs 102*a-f* from MEA processor 2. Partition B may be assigned the two SPEs 102*g, h* and the 90% of the GPPE resources remaining on MEA processor 2. Partition C may be configured to utilize MEA processor 3.

In embodiments consistent with the invention, partition A would receive the SPE resources it requires and would not interfere with the operations of partition B or C. In particular, partition A would not interfere with partition B's use of the SPE 102*g* or SPE 102*h* on MEA processor 2. In embodiments consistent with the invention, partition A may mainly need the operation of three SPEs to complete its computations. The virtualization layer would control access to partition A's SPEs such that the SPE chains (i.e., use of the same SPEs) are always made on the same processor. In this example, the SPE chains may be made on MEA processor 1 or MEA processor 2.

Example 4

By way of example, computer 10 may be configured with two partitions (partition A and partition B) that have similar workloads and require similar numbers of SPEs to execute highly computational tasks. Computer 10 may be configured with one or more MEA processors 18. However, the load of the partitions will vary throughout the day. Additionally, there is a requirement that each of the partitions be able to complete a given workload within a specified amount of time.

Utilizing conventional black box slicing, logical partition A and logical partition B might be assigned 50% of all resources. This means that logical partition A and logical partition B would receive 50% of all GPPE resources and 50% of all SPE resources on the MEA processor 18. Suboptimal resource usage would result in such a situation, as 50% of the resources would be left under-utilized if one partition A or B is idle.

Utilizing conventional MultiSPE management, the workload of one partition may dominate the usage of the processing resources with long running tasks running on dedicated SPEs. This may lead to a failure for one of the partitions to meet the respective performance requirement.

Utilizing conventional Kernel management, the hypervisor 28 may be used to manage the utilization of the SPEs such that workload from one partition does not dominate the usage of the SPEs. However, the high cost of context switches in the SPE resources in order to keep balance may have a negative impact on the overall performance of the computer.

In embodiments consistent with the invention, on the other hand, partition A and partition B may be configured with their individual optimal performance requirements, which for example may be 25% of all processing capabilities. One skilled in the art will realize that a performance requirement may require more or fewer resources, and that this is an illustrative example. Partition A and partition B may then be configured to share the free resources that remain in the computer 10. In this way, partition A may be assigned 25% of the GPPE resources and 25% of the SPE resources. Logical partition B may be assigned 25% of the GPPE resources and 25% of the SPE resources. Embodiments consistent with the invention then enable the free resources to be shared between partition A and partition B as needed throughout the day. The resources may be shared exclusively as a task is executed, or in a shared manner based on load of either partition.

While the present invention has been illustrated by a description of various embodiments and examples, and while these embodiments and examples have been described in considerable detail, it is not the intention of the applicants to restrict, or in any way limit, the scope of the appended claims to such detail. For example, another embodiment consistent with the invention supports MEA processors with more than one GPPE and fewer or greater than eight SPEs. In this embodiment, the SGAR may be improved by comparing the SPE resources to both GPPE resources as a whole on the MEA processor and determining alternate configurations that would improve the SGAR as it relates to the MEA processor with more than one GPPE. Another embodiment consistent with the invention supports fewer or greater numbers of logical partitions. A further alternate embodiment consistent with the invention supports more than one hypervisor to manage the resources on the computer.

Additionally, while adjustments of the SGAR have been illustrated by a description of various embodiments and examples, and while these embodiments and examples have been described in considerable detail, it is not the intention of the applicants to restrict, or in any way limit, the scope of the appended claims to such detail. For example, another embodiment consistent with the invention supports a procedure for adjusting the SGAR only after a certain amount of time, after particular resources have been freed, or after some other condition has been satisfied. In that embodiment, the SGAR is not adjusted after any change in the resources, but rather the SGAR adjustments may be "throttled" to better control rebalancing and prevent the rebalancing of the resources becoming rampant. The particular way to throttle the SGAR adjustment may be configured by a system administrator or by design. Another embodiment consistent with the invention adjusts the SGAR of at least one logical partition after the cessation of other logical partitions across multiple MEA processors. Furthermore, another embodiment consistent with the invention utilizes a robust SGAR adjustment scheme that optimizes the SGAR by determining all alternative SGARs after resources have been freed. The optimal SGAR is then selected, and at least one logical partition is reconfigured utilizing that optimized configuration. As such, additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed is:
1. A method of allocating processor resources to a plurality of logical partitions in a computing device of a type including a plurality of physical processors, each physical processor having at least one physical general purpose processing element and a plurality of physical synergistic processing elements controlled by the at least one physical general purpose processing element, the method comprising:
   in the computing device, allocating general purpose processing element resources to each logical partition, wherein the allocated general purpose processing element resources are associated with at least a portion of at least one physical general purpose processing element of the plurality of physical general purpose processing elements associated with the plurality of physical processors;

in the computing device, allocating synergistic processing element resources to each logical partition such that the general purpose processing element resources and the synergistic processing element resources are separately allocated to each logical partition, wherein allocating synergistic processing element resources to each logical partition includes allocating physical synergistic processing elements such that each physical synergistic processing element that is allocated to a logical partition is allocated exclusively to that logical partition, and wherein the allocated synergistic processing element resources are associated with at least a subset of the plurality of physical synergistic processing elements associated with the plurality of physical processors; and in the computing device, localizing the allocated general purpose processing element resources and synergistic processing element resources for each logical partition such that general purpose processing element resources and synergistic processing element resources allocated to each logical partition are co-located on the same physical processors.

2. The method of claim 1, wherein allocating general purpose processing element resources and allocating synergistic processing element resources to each logical partition further comprises:

allocating at least one virtual processor to each logical partition such that each virtual processor appears to its logical partition as a physical processor having general purpose processing element resources and synergistic processing element resources corresponding to those allocated to the logical partition.

3. The method of claim 2, wherein allocating at least one virtual processor to each logical partition further comprises:

allocating virtual general purpose processing element resources to each virtual processor, wherein virtual general purpose processing element resources utilize the allocated general purpose processing element resources for a logical partition.

4. The method of claim 3, wherein allocating the at least one virtual processor to each logical partition further comprises:

allocating virtual synergistic processing element resources to the at least one virtual processor, wherein virtual synergistic processing element resources utilize the allocated synergistic processing element resources for a logical partition.

5. The method of claim 1, further comprising:

determining free resources that are not allocated to the plurality of logical partitions, wherein the free resources are general purpose processing element resources and synergistic processing element resources that are not allocated to the plurality of logical partitions; and in response to detecting a change in the free resources, dynamically reallocating general purpose processing element resources and synergistic processing element resources such that general purpose processing element resources and synergistic processing element resources allocated to at least one logical partition from among the plurality of logical partitions are co-located on the same physical processors.

6. The method of claim 1, further comprising:

determining free resources that are not allocated to the plurality of logical partitions, wherein the free resources are general purpose processing element resources and synergistic processing element resources that are not allocated to the plurality of logical partitions; and sharing the free resources among the plurality of logical partitions.

7. The method of claim 6, wherein sharing the free resources among the plurality of logical partitions further comprises:

allocating free general purpose processing element resources to a logical partition such that general purpose processing element resources assigned to that logical partition are allocated exclusively to that logical partition.

8. The method of claim 6, wherein sharing the free resources among the plurality of logical partitions further comprises:

allocating free synergistic processing element resources to a logical partition such that each synergistic processing element that is assigned to that logical partition is allocated exclusively to that logical partition.

9. The method of claim 1, wherein allocating the general purpose processing element resources includes, for each logical partition, allocating general purpose processing element resources on each physical processor upon which synergistic processing element resources are allocated for that logical partition to ensure that the allocated general purpose processing element resources are co-located with all synergistic processing element resources for that logical partition such that the allocated general purpose processing element resources can control the allocated synergistic processing element resources for that logical partition.

10. A method of allocating processor resources to at least one logical partition in a computing device of a type including at least one physical processor, each physical processor having at least one physical general purpose processing element and a plurality of physical synergistic processing elements controlled by the at least one physical general purpose processing element, the method comprising:

determining a general purpose processing element requirement for the logical partition;

determining a synergistic processing element requirement for the logical partition;

in the computing device, and in response to determining the general purpose processing element requirement for the logical partition, configuring the logical partition to utilize at least a portion of the at least one general purpose processing element by allocating the at least a portion of the at least one general purpose processing element to the logical partition;

in the computing device, and in response to determining the synergistic processing elements requirement for the logical partition, configuring the logical partition to utilize a subset of the plurality of synergistic processing elements by allocating the subset of the plurality of synergistic processing elements to the logical partition; and in the computing device, localizing the at least a portion of the at least one general purpose processing element and the allocated subset of the plurality of synergistic processing elements allocated to the logical partition such that the at least a portion of the at least one general purpose processing element and the allocated subset of the plurality of synergistic processing elements allocated to the logical partition are co-located on the same physical processors.

11. An apparatus comprising:
   a plurality of physical processors, each physical processor comprising:
      at least one physical general purpose processing element; and
      a plurality of physical synergistic processing elements controlled by the at least one physical general purpose processing element; and
   program code configured to be executed by the plurality of physical processors to allocate general purpose processing element resources to each logical partition of a plurality of logical partitions, and allocate synergistic processing element resources to each logical partition such that the general purpose processing element resources and the synergistic processing element resources are separately allocated to each logical partition, wherein the program code is configured to allocate synergistic processing element resources to each logical partition by allocating physical synergistic processing elements such that each physical synergistic processing element that is allocated to a logical partition is allocated exclusively to that logical partition, wherein the allocated general purpose processing element resources are associated with at least a portion of at least one physical general purpose processing element of the plurality of physical general purpose processing elements associated with the plurality of physical processors, and wherein the allocated synergistic processing element resources are associated with at least a subset of the plurality of physical synergistic processing elements associated with the plurality of physical processors, wherein the program code is further configured to localize the allocated general purpose processing element resources and synergistic processing element resources for each logical partition such that general purpose processing element resources and synergistic processing element resources allocated to each logical partition are co-located on the same physical processors.

12. The apparatus of claim 11, wherein the program code is further configured to allocate at least one virtual processor to each logical partition such that each virtual processor appears to its logical partition as a physical processor having general purpose processing element resources and synergistic processing element resources.

13. The apparatus of claim 12, wherein the program code is further configured to allocate virtual general purpose processing element resources to each virtual processor, wherein virtual general purpose processing element resources utilize the allocated general purpose processing element resources for a logical partition.

14. The apparatus of claim 13, wherein the program code is further configured to allocate virtual synergistic processing element resources to the at least one virtual processor, wherein virtual synergistic processing element resources utilize the allocated synergistic processing element resources for a logical partition.

15. The apparatus of claim 11, wherein the program code is further configured to determine free resources that are not allocated to the plurality of logical partitions, wherein the free resources are general purpose processing element resources and synergistic processing element resources that are not allocated to the plurality of logical partitions, and dynamically reallocate general purpose processing element resources and synergistic processing element resources such that general purpose processing element resources and synergistic processing element resources allocated to at least one logical partition from among the plurality of logical partitions are co-located on the same physical processors in response to detecting a change in the free resources.

16. The apparatus of claim 11, wherein the program code is further configured to determine free resources that are not allocated to the plurality of logical partitions, wherein the free resources are general purpose processing element resources and synergistic processing element resources that are not allocated to the plurality of logical partitions, and share the free resources among the plurality of logical partitions.

17. The apparatus of claim 16, wherein the program code is further configured to allocate free general purpose processing element resources to a logical partition such that general purpose processing element resources assigned to that logical partition are allocated exclusively to that logical partition.

18. The apparatus of claim 16, wherein the program code is further configured to allocate free synergistic processing element resources to a logical partition such that each synergistic processing element that is assigned to that logical partition is allocated exclusively to that logical partition.

19. The apparatus of claim 11, wherein the program code is further configured to associate the allocated general purpose processing element resources with at least a portion of at least one general purpose processing element of the plurality of general purpose processing elements associated with the plurality of physical processors.

20. The apparatus of claim 11, wherein the program code is further configured to associate the allocate synergistic processing element resources with a subset of the plurality of synergistic processing elements associated with the plurality of physical processors.

21. A program product, comprising:
   program code configured to allocate processor resources to a plurality of logical partitions in a computing device of a type including a plurality of physical processors, each physical processor having at least one physical general purpose processing element and a plurality of physical synergistic processing elements controlled by the at least one physical general purpose processing element, the program code further configured to allocate general purpose processing element resources to each logical partition, and allocate synergistic processing element resources to each logical partition such that the general purpose processing element resources and the synergistic processing element resources are separately allocated to each logical partition, wherein the program code is configured to allocate synergistic processing element resources to each logical partition by allocating physical synergistic processing elements such that each physical synergistic processing element that is allocated to a logical partition is allocated exclusively to that logical partition, wherein the allocated general purpose processing element resources are associated with at least a portion of at least one physical general purpose processing element of the plurality of physical general purpose processing elements associated with the plurality of physical processors, and wherein the allocated synergistic processing element resources are associated with at least a subset of the plurality of physical synergistic processing elements associated with the plurality of physical processors, wherein the program code is further configured to localize the allocated general purpose processing element resources and synergistic processing element resources for each logical partition such that general purpose processing element resources and synergistic processing element resources allocated to each logical partition are co-located on the same physical processors; and
   a non-transitory computer readable medium bearing the program code.

* * * * *